US010438029B2

(12) United States Patent  
Al-kadi et al.

(10) Patent No.: US 10,438,029 B2  
(45) Date of Patent: Oct. 8, 2019

(54) MOBILE DEVICE AND READER FOR FACILITATING A TRANSACTION

(71) Applicant: NXP B.V., Eindhoven (NL)

(72) Inventors: Ghiath Al-kadi, Graz (AT); Ulrich Neffe, Albersdorf-Prebuch (AT); Peter Raggam, Sankt Stefan im Rosental (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/996,440

(22) Filed: Jun. 2, 2018

(65) Prior Publication Data

US 2018/0349653 A1 Dec. 6, 2018

(30) Foreign Application Priority Data

Jun. 2, 2017 (EP) ..................................... 17174224

(51) Int. Cl.
*G06K 7/10* (2006.01)
*H04B 5/00* (2006.01)
(Continued)

(52) U.S. Cl.
CPC ......... *G06K 7/10297* (2013.01); *G07B 15/00* (2013.01); *G07C 9/00111* (2013.01); *H04B 5/0056* (2013.01)

(58) Field of Classification Search
None
See application file for complete search history.

(56) References Cited

U.S. PATENT DOCUMENTS 6,473,055 B2 10/2002 Kohno et al.
9,489,672 B1 11/2016 Poole et al.
(Continued)

FOREIGN PATENT DOCUMENTS

CN 10-3248397 A 8/2013
JP H7-105329 A 4/1995
(Continued)

OTHER PUBLICATIONS

Extended European Search Report for Patent Appl. No. 17174224.0 (dated Nov. 22, 2017).

*Primary Examiner* — Kristy A Haupt (57) ABSTRACT

According to a first aspect of the present disclosure, a mobile device for facilitating a transaction is provided, comprising: a secure element configured to contain transaction-related data; an ultra-wideband radio unit operatively coupled to the secure element and configured to carry out ultra-wideband radio communication with an external reader; wherein the ultra-wideband radio unit is configured to operate as an interface between the secure element and said external reader. According to a second aspect of the present disclosure, a reader for facilitating a transaction is provided, comprising: an ultra-wideband communication and tracking unit configured to communicate with at least one external mobile device having an ultra-wideband radio unit and to track said mobile device; a processing unit operatively coupled to the ultra-wideband communication and tracking unit, said processing unit being configured to process at least one transaction. According to a third aspect of the present disclosure, a corresponding method for facilitating a transaction using a reader is conceived. According to a fourth aspect of the present disclosure, a corresponding computer program is provided.

20 Claims, 4 Drawing Sheets

(51) Int. Cl.
*G07B 15/00* (2011.01)
*G07C 9/00* (2006.01)

(56) References Cited

U.S. PATENT DOCUMENTS

| | | |
|---|---|---|
| 9,898,728 B2 | 2/2018 | Brudnicki et al. |
| 2013/0069761 A1 | 3/2013 | Tieman |
| 2015/0077282 A1 | 3/2015 | Mohamadi |
| 2016/0260073 A1 | 9/2016 | Colnot et al. |
| 2016/0358385 A1 | 12/2016 | Ziebell et al. |

FOREIGN PATENT DOCUMENTS

| | | | |
|---|---|---|---|
| JP | 2003-196692 A | 7/2003 | |
| JP | 2006-352850 A | 12/2006 | |
| JP | 2011-192293 A | 9/2011 | |
| KR | 10-2007-0073255 | 7/2007 | |
| WO | WO 2005024734 A1 * | 3/2005 | ............ B60R 25/24 |
| WO | 2009028036 A1 | 11/2010 | |
| WO | 2015/176776 A | 11/2015 | |

\* cited by examiner

MOBILE DEVICE AND READER FOR FACILITATING A TRANSACTION

CROSS-REFERENCE TO RELATED APPLICATIONS

This application claims the priority under 35 U.S.C. § 119 of European patent application no, 17174224.0, filed on Jun. 2, 2017, the contents of which are incorporated by reference herein.

FIELD

The present disclosure relates to a mobile device for facilitating a transaction. Furthermore, the present disclosure relates to a reader for facilitating a transaction, a corresponding method for facilitating a transaction using a reader, and a corresponding computer program.

BACKGROUND

Today, automated fare collection (AFC) systems often make use of near field communication (NFC) technology for carrying out transactions in the public transportation sectors. Specifically, tickets can be purchased using NFC, and the terminals at the stations allow for NFC-based ticket validation and automated entry of the passengers: when a user's ticket is valid, a gate (e.g., a turnstile) is automatically opened. Tickets may be stored on a smart card or in a secure element comprised in a mobile device. NFC has a relatively short communication range, which enables a secure check-in and check-out process. However, a disadvantage of NFC is that passenger queues may form at said terminals.

SUMMARY

According to a first aspect of the present disclosure, a mobile device for facilitating a transaction is provided, comprising: a secure element configured to contain transaction-related data; an ultra-wideband radio unit operatively coupled to the secure element and configured to carry out ultra-wideband radio communication with an external reader; wherein the ultra-wideband radio unit is configured to operate as an interface between the secure element and said external reader.

In an embodiment, the mobile device further comprises a near field communication unit and/or an additional wireless communication unit.

In an embodiment, the secure element and the near field communication unit are integrated in a single circuit or package.

According to a second aspect of the present disclosure, a reader for facilitating a transaction is provided, comprising: an ultra-wideband communication and tracking unit configured to communicate with at least one external mobile device having an ultra-wideband radio unit and to track said mobile device by tracking its ultra-wideband radio unit; a processing unit operatively coupled to the ultra-wideband communication and tracking unit, said processing unit being configured to process at least one transaction.

In an embodiment, the processing unit is configured to process said transaction in cooperation with an external server.

In an embodiment, processing the transaction comprises receiving transaction-related data from the mobile device.

In an embodiment, processing the transaction includes tracking said mobile device within predefined zones around the reader.

In an embodiment, processing the transaction includes: if the mobile device is present in a first zone, receiving a first credential from the mobile device and verifying said first credential, and if said first credential valid, registering the transaction on the server; if the mobile device is present in a second zone, registering the transaction on the mobile device.

In an embodiment, the processing unit is configured to instruct, if the mobile device is in the first zone and the first credential is valid, a terminal to open a gate.

In an embodiment, processing the transaction further includes: if the mobile device is present in a third zone, receiving a second credential from the mobile device and verifying said second credential, and if said second credential is valid, finalizing the transaction on the server; if the mobile device is present in a fourth zone, finalizing the transaction on the mobile device.

In an embodiment, the processing unit is configured to instruct, if the mobile device is in the third zone and the second credential is valid, a terminal to open a gate.

In an embodiment, the reader further comprises at least one additional ultra-wideband communication and tracking unit, wherein the reader is configured to determine an angle of arrival of the mobile device using the ultra-wideband communication and tracking unit and the additional ultra-wideband communication and tracking unit.

In an embodiment, a system comprises a mobile device of the kind set forth and a reader of the kind set forth.

According to a third aspect of the present disclosure, a method for facilitating a transaction using a reader is conceived, said reader comprising an ultra-wideband communication and tracking unit and a processing unit operatively coupled to said ultra-wideband communication and tracking unit, the method comprising: the ultra-wideband communication and tracking unit communicates with at least one external mobile device having an ultra-wideband radio unit and tracks said mobile device by tracking its ultra-wideband radio unit; the processing unit processes at least one transaction.

According to a fourth aspect of the present disclosure, a computer program is provided, comprising non-transient executable instructions that, when executed by an ultra-wideband communication and tracking unit or a processing unit, cause said ultra-wideband communication and tracking unit and processing unit to carry out or control a method of the kind set forth.

BRIEF DESCRIPTION OF THE DRAWINGS

Embodiments will be described in more detail with reference to the appended drawings, in which.

DESCRIPTION OF EMBODIMENTS

Figure 1:
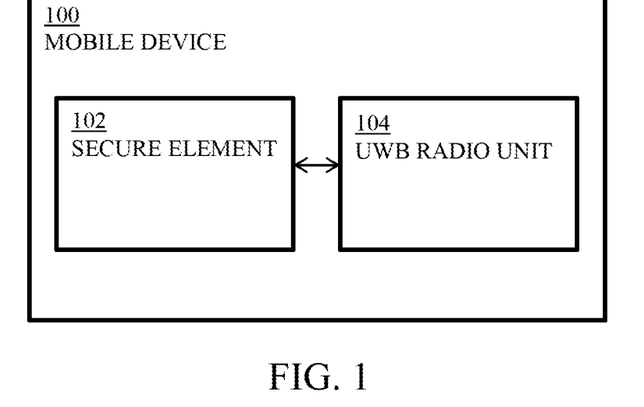
FIG. 1 shows an illustrative embodiment of a mobile device.

FIG. 1 shows an illustrative embodiment of a mobile device 100. The mobile device 100 comprises a secure element 102 and an ultra-wideband radio unit 104 that are operatively coupled to each other. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. Ultra-wideband (UWB) is a radio technology that is able to use a very low energy level for short-range, high-bandwidth communications over a large portion of the radio spectrum. UWB has traditional applications in non-cooperative radar imaging. Most recent applications target sensor data collection, precision locating and tracking applications. Compared to NFC, the range of communication of UWB is larger. In this embodiment, the secure element 102 is configured to contain transaction-related data. For example, these transaction-related data may contain a device identifier, a credential, a ticket, a certificate, and other data that are needed or useful for carrying out a transaction. Furthermore, the UWB radio unit 104 is configured to carry out UWB radio communication with an external reader (not shown). More specifically, the UWB radio unit 104 is configured to operate as an interface between the secure element 102 and said external reader.

The presently disclosed mobile device 100 facilitates carrying out transactions, such as fare payments, because the UWB radio unit 104 can be tracked with high accuracy and at the same time it can be used as a communication interface between the secure element 102 and the reader. In NFC-based systems, the user should be in close proximity of a reader in order to carry out a transaction. For example, in AFC systems based on NFC, once the transaction is finalized, a command is sent to the terminal, which causes a gate to open, and the user is allowed to pass through. Due to the limited communication range of around 10 cm., it is not possible to start the process before the user has physically reached the gate and provided his payment tool (e.g. an NFC-enabled device) to the AFC system's reader. Thus, in highly populated areas the system may become slow, and cause delays and formation of passenger queues. The inventors have realized that the presently disclosed mobile device 100 may avoid such delays, because the UWB radio unit 104 facilitates performing preparatory operations, such as ticket or payment handling, while approaching the gate. This is possible because the data exchange can be done in a secure manner and the mobile device 100 can be tracked with high accuracy. For example, preparatory operations may include verifying a credential (e.g., a ticket); these operations may be performed within a range of approximately 5 meters of a gate. If the credential is valid, the gate may be opened when the distance between the mobile device 100 and the reader is approximately 30 cm., for example. In this example, it is assumed that the reader is attached to or integrated in a terminal, and that the terminal includes or is coupled to a gate that is controlled by said terminal.

Figure 2:
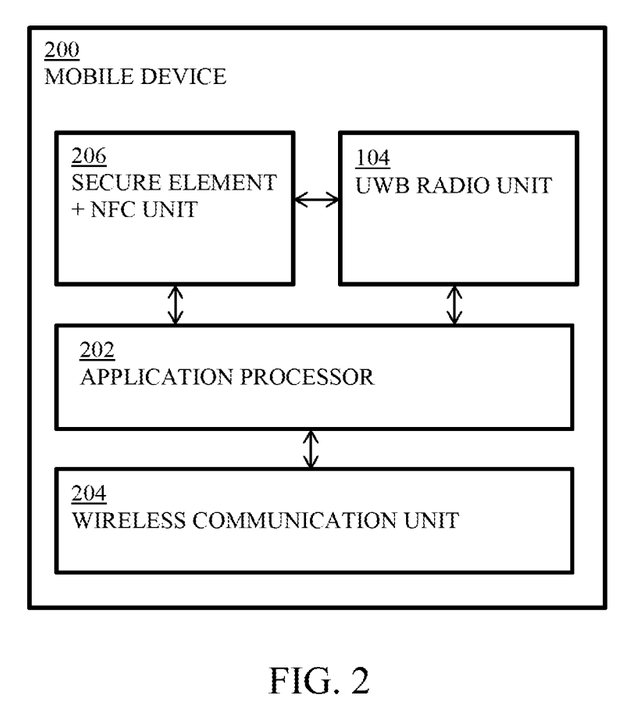
FIG. 2 shows another illustrative embodiment of a mobile device.

FIG. 2 shows another illustrative embodiment of a mobile device 200. In addition to the UWB radio unit 104 shown in FIG. 1, the mobile device comprises a single component 206 (e.g., a single circuit or package) that includes a secure element and an NFC unit. Component 206 is operatively coupled to the UWB radio unit 104. Furthermore, the mobile device 200 comprises an application processor 202 operatively coupled to component 206 and the UWB radio unit 104. Furthermore, the mobile device 200 comprises an additional wireless communication unit 204 operatively coupled to the application processor 202. Wireless communication unit 204 may for example be a connectivity chipset that enables cellular communication. As mentioned above, in one or more embodiments, the mobile device comprises an NFC unit and/or an additional wireless communication unit. The NFC unit and the additional wireless communication unit facilitate purchasing or acquiring transaction-related data, such as tickets, by NFC and over-the-air communication, respectively. The application processor 202 may operate as an interface between the other components 104, 204, 206 of the mobile device. In this practical and efficient implementation, the secure element and the NFC unit are integrated in component 206.

Figure 3:
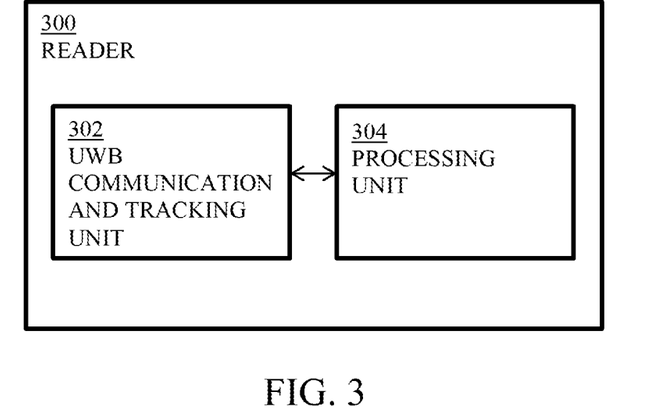
FIG. 3 shows an illustrative embodiment of a reader.

FIG. 3 shows an illustrative embodiment of a reader 300. The reader 300 comprises a UWB communication and tracking unit 302 and a processing unit 304 that are operatively coupled to each other. The UWB communication and tracking unit 302 is configured to carry out UWB radio communication with an external UWB radio unit in a mobile device (not shown). Furthermore, the UWB communication and tracking unit 302 is configured to track said mobile device by tracking its UWB radio unit. Furthermore, the processing unit 304 is configured to process at least one transaction. Thus, this reader 300 enables tracking the mobile device 100 shown in FIG. 1 and obtaining or exchanging transaction-related data with said mobile device 100. In this way, as explained above, delays in transaction processing and associated passenger queues may be avoided or at least reduced. Thus, the reader is particularly useful in an automated fare collection (AFC) system. In a practical and efficient implementation, the operations performed by the reader 300 may be executed or controlled by a computer program. Processing a transaction may comprise receiving transaction-related data from the mobile device through a UWB communication channel established between the UWB communication and tracking unit 302 and the UWB radio unit of the mobile device. The processing unit 304 may be configured to process the transaction in cooperation with an external server (not shown), which facilitates centrally managing transactions and user account balances, for example.

Figure 4:
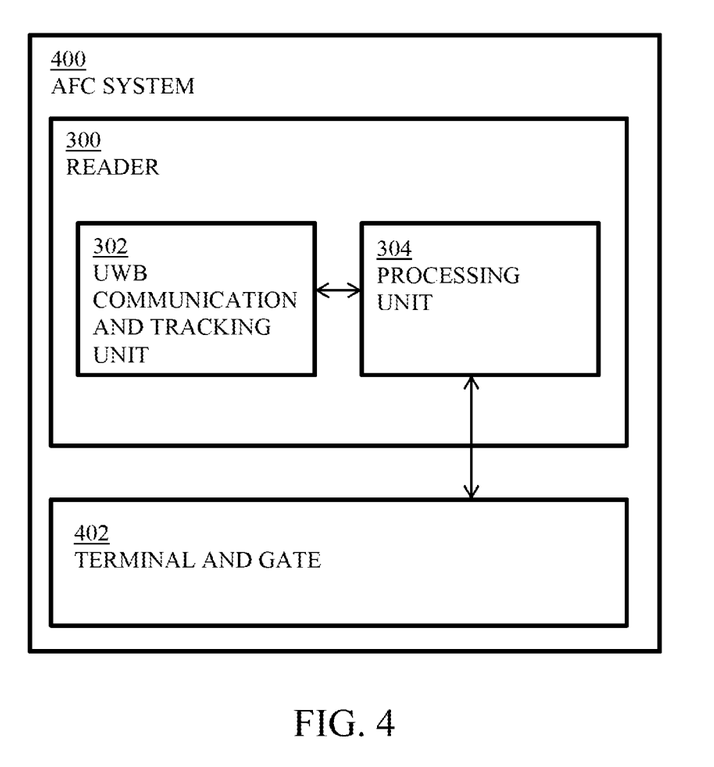
FIG. 4 shows an illustrative embodiment of an AFC system.

FIG. 4 shows an illustrative embodiment of an AFC system 400. The AFC system 400 comprises a reader 300 of the kind set forth and a unit 402 that comprises a terminal and a gate. The processing unit 304 of the reader 300 is operatively coupled to the unit 402. In this way, the processing unit 304 may send instructions to the terminal, for example an instruction to open a gate if a credential, received from a mobile device through the UWB communication channel, is valid. The credential may for example comprise ticket data that should be verified. For instance, it may be verified whether the ticket data have been validly purchased and whether they have not expired.

Figure 5:
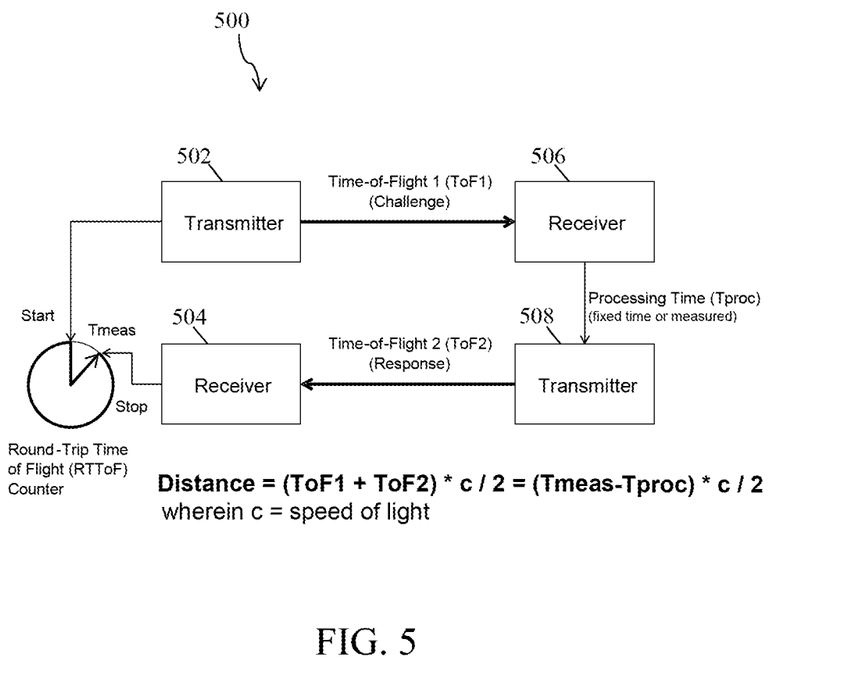
FIG. 5 shows an illustrative embodiment of a distance measurement.

FIG. 5 shows an illustrative embodiment of a distance measurement 500. The distance measurement 500 of this example may be executed by the reader 300. Specifically, the distance measurement 500 may be executed by the UWB communication and tracking unit 302. The distance measurement 500 may form part of a tracking process performed by said reader 300. The distance measurement 500 employs the so-called time-of-flight technique used in RF ranging systems, which enables determining the distance between two objects or markers on objects. According to this technique, a transceiver's transmitter sends out a waveform (commonly a chirp or a pulse), which is either reflected by an object or retransmitted by a second transceiver. Based on the amount of time it takes retransmission to reach the originating transceiver's receiver, the distance between the objects can be calculated. For an RF ranging system based on two transceivers, this principle is sketched in FIG. 5. In accordance with the present disclosure, UWB communication and tracking unit 302 comprises transmitter 502 and receiver 504. Furthermore, receiver 506 and transmitter 508 are included in a UWB radio unit 104 that is being tracked. UWB provides sufficient tracking accuracy, so it particularly suitable for use in transaction-related systems (e.g., AFC systems). In addition to measuring the distance, the reader 300 may determine the so-called angle of arrival of the UWB radio unit 104. In that case, the same signal may be received twice and the difference between the arrivals of the signal indicates the position of the UWB radio unit 104 with respect to the reader 300. Thereby, the device's location can be determined within a 360-degree radius around the reader. Specifically, the reader may have two receivers and two antennas coupled to said receivers. The distance between the two antennas is then a multiple of ($\lambda$) with minimum distance off ½$\lambda$. An RF frame will be received by the two parallel receivers almost at the same time, but with a minor phase difference. Based on this phase difference, the angle of the incoming RF frame can be calculated. Hence the reader is not only able to determine the distance between the mobile device and the reader, but also the location of the device in the 360-degree radius. Thus, in or more embodiments, the reader further comprises at least one additional ultra-wideband communication and tracking unit, wherein the reader is configured to determine an angle of arrival of the mobile device using the ultra-wideband communication and tracking unit and the additional ultra-wideband communication and tracking unit. Determining the location of a mobile device using its angle of arrival enables, in a multi-reader system, to select the reader that is nearest to the mobile device for tracking it. This, in turn, enables an optimization of the tracking of many users as each reader can track a few dedicated mobile devices or users. Alternatively, triangulation techniques can be used to determine this position. Triangulation techniques make use of multiple readers, for example two or three readers.

Figure 6:
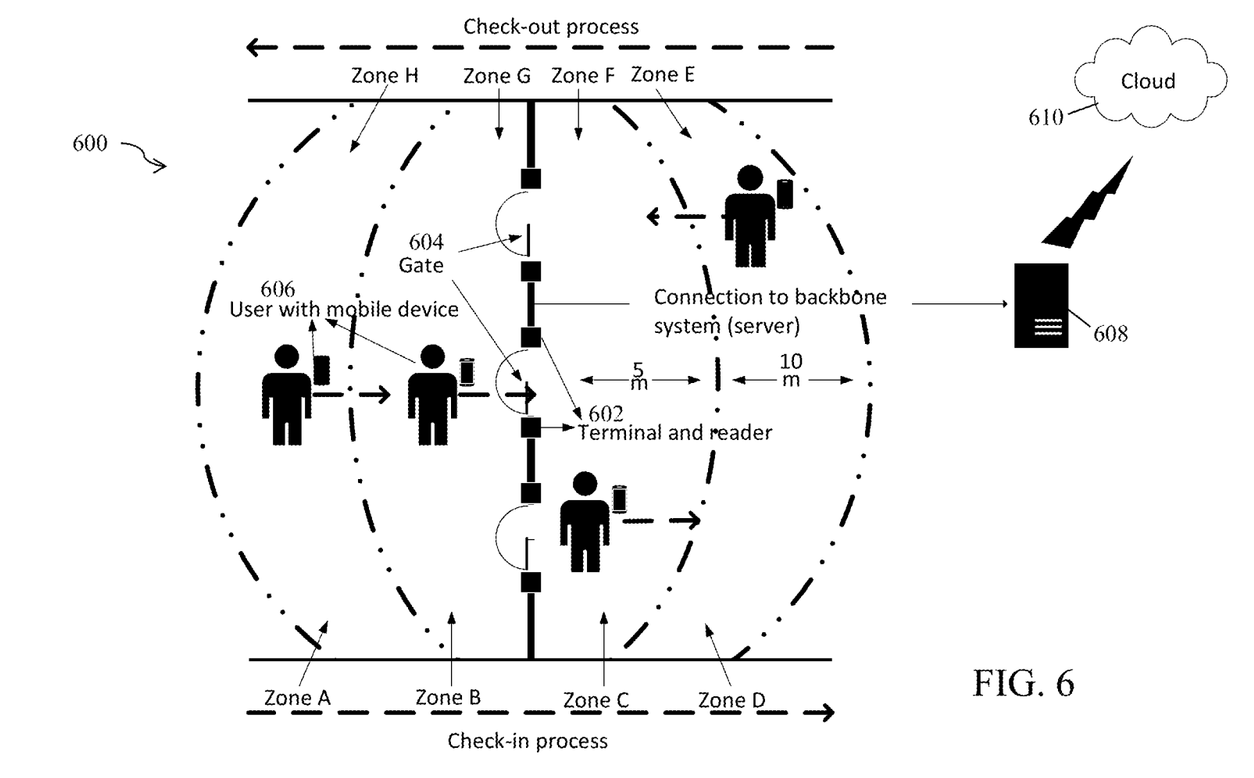
FIG. 6 shows another illustrative embodiment of an AFC system.

FIG. 6 shows another illustrative embodiment of an AFC system 600. The AFC system 600 comprises a plurality of terminals 602 that are equipped with a reader 300 of the kind set forth. For example, the reader 300 may be fully integrated into the terminal 602. Furthermore, each terminal 602 may be coupled to or include a gate 604 (i.e., a turnstile or another type of gate). A user 606 who carries a mobile device 100, 200 of the kind set forth may approach the terminal 602. It is noted that this mobile device may be a mobile phone, for example, but also a wearable device. As mentioned above, in one or more embodiments, processing the transaction includes tracking the mobile device within predefined zones around the reader. In this way, specific actions or operations may be associated with the different zones, which facilitates the execution of the transaction. In the example shown in FIG. 6, four different zones are defined for a check-in process, and four different zones are defined for a check-out process. Zones B, C, F, G, may for example be defined as a range of 0 to 5 meters around the reader. Zones A, D, E, H, may for example be defined as a range of 5 to 15 meters around the reader. Furthermore, the AFC system 600 comprises a server 608 or backbone system that is connected to the cloud 610.

In some embodiments, processing the transaction includes: if the mobile device is present in a first zone, receiving a first credential from the mobile device and verifying said first credential, and if said first credential valid, registering the transaction on the server 608; if the mobile device is present in a second zone, registering the transaction on the mobile device. Furthermore, in some embodiments, the processing unit 304 of the reader 300 is configured to instruct, if the mobile device is in the first zone and the first credential is valid, a terminal 602 to open a gate 604. In this way, the execution of the transaction if further facilitated and the risk of delays and passenger queues is reduced. Thus, passenger movements may be streamlined. The first zone may for example correspond to "Zone B" defined for the check-in process shown in FIG. 6, and the second zone may correspond to "Zone C" defined for said check-in process.

Furthermore, in some embodiments, processing the transaction further includes: if the mobile device is present in a third zone, receiving a second credential from the mobile device and verifying said second credential, and if said second credential is valid, finalizing the transaction on the server; if the mobile device is present in a fourth zone, finalizing the transaction on the mobile device. Furthermore, in some embodiments, the processing unit 304 of the reader 300 is configured to instruct, if the mobile device is in the third zone and the second credential is valid, a terminal to open a gate. In this way, the execution of the transaction if further facilitated and the risk of delays and passenger queues is reduced. Thus, passenger movements may be streamlined. The third zone may for example correspond to "Zone F" defined for the check-out process shown in FIG. 6, and the fourth zone may correspond to "Zone G" defined for said check-out process. Zones A, D, E and H shown in FIG. 6 may be associated with other actions or operations that further facilitate the execution of transactions and streamline passenger movements.

A more detailed example of processing a transaction will now be described with reference to FIG. 6. Processing the transaction involves a check-in process and a check-out process. In this example, the transaction comprises the payment of a fare, for example to access an underground railway system.

Check-in Process

The lower part of FIG. 6 shows the check-in process. In this example, four different zones A, B, C, D are defined around a terminal and reader 602. The zones may be defined, for example, as a certain range around said terminal and reader 602. If a mobile device or wearable device is detected within this range, it is assigned to the corresponding zone. A user has purchased a first credential (e.g., a ticket or a token that identifies a particular user and/or subscription) that is stored in a secure element of the mobile device. The mobile device may be a smart phone or a wearable device, for example. The ticket may have been purchased through NFC or over-the-air. The check-in process contains the following steps:

Zone A: if a mobile device is detected in this zone, the reader may start tracking this device. The mobile device, when present in this zone, may receive a wake-up signal through a secondary radio, it may use geolocation software to wake up the UWB radio, or the UWB radio unit may operate in a sniffing mode looking for a UWB readers. At this stage, only an identifier of the mobile device may be provided to the reader. This device identifier may be exchanged between the reader and the mobile device during the distance measurement operations that form part of the tracking process. The backbone system maintains a list of all mobile devices that are present in zone A.

Zone B: when the user 606 walks towards the gate, the mobile device will enter zone B at a given moment in time. Since the mobile device is tracked, this change of zone will be detected. Then, the system may start an authentication process that involves verifying the first credential (i.e., the ticket or user/subscription identifier). If the first credential is valid, the transaction (i.e., the fare deduction) may be registered on the server 608. For instance, this registration involves reserving a predefined amount of money for the journey. This reservation may be maintained on the server 608 as long as the user remains in zone B. If the user returns to zone A, the reservation may be released or undone. If the user stays in zone B and further approaches the gate—for example if his mobile device is detected within approximately 30 cm. of the gate—then the reader may instruct the terminal to open the gate automatically. In that case, the transaction may be booked on the server 608, e.g. by keeping the reservation of said predefined amount of money. In this example, it is assumed that the fare will be settled during the check-out process. It is noted that the server 608 may prevent fraud, in the sense that an attempt to switch one device for another can be detected.

Zone C: If the mobile device is detected in zone C, the transaction is also registered or booked on the mobile device.

Zone D: If the mobile device is detected in zone D, the user gets the traveling status, and the identifier of his mobile device may be moved to the cloud 610 through the server 608, for use in the check-out process.

It is noted that if the user did not enter zone C and remained in zone B or A. then the ticket may not be useable for a given amount of time, in order to prevent fraud. Also, if a transaction has been booked and the associated mobile device is detected in zone C or D, the ticket, check-in location identifier and device identifier may be stored in the cloud 610 for after-sale booking, which will be initiated once the same mobile device is detected in the check-out process.

Check-out Process

The upper part of FIG. 6 shows the check-in process. In this example, four different zones E, F, G, H are defined around a terminal and reader 602. The zones may be defined, for example, as a certain range around said terminal and reader 602. If a mobile device is detected within this range, it is assigned to the corresponding zone. A user who is traveling legitimately will have a validly booked transaction in the cloud 610, which has been associated with his mobile device identifier. The check-out process contains the following steps:

Zone E: if a mobile device is detected in this zone, the reader may start tracking this device. The mobile device, when present in this zone, may receive a wake-up signal through a secondary radio, it may use geolocation software to wake up the UWB radio, or the UWB radio unit may operate in a sniffing mode looking for a UWB readers. At this stage, an identifier of the mobile device may be provided to the reader. This device identifier may be exchanged between the reader and the mobile device during the distance measurement operations that form part of the tracking process. Furthermore, information may be retrieved from the cloud 610, for instance the check-in location, so that an exact fare calculation can be performed, and/or a determination as to whether the travel distance matches the amount of money reserved during the check-in process. Furthermore, detected users for whom no information can be found in the cloud 610 may be subjected to an after-sale process, for example.

Zone F: when the user 606 walks towards the gate, the mobile device will enter zone F at a given moment in time. Since the mobile device is tracked, this change of zone will be detected. Then, the system may start an authentication process that involves verifying a second credential. The second credential may be the same as the first credential or a derivative of the first credential. If the second credential is valid, the transaction may be finalized on the server 608. Finalizing the transaction may comprise, for instance, changing a user balance based on a calculated travel distance. Furthermore, if the second credential is valid and the user further approaches the gate —for example if his mobile device is detected within approximately 30 cm. of the gate —then the reader may instruct the terminal to open the gate automatically. It is noted that if the user traveled without a valid ticket or subscription, then this may be detected and a station guard may be informed, for example.

Zone G: if the mobile device is detected in zone G, the transaction is also finalized on the mobile device. For instance, the user balance may also be updated on the mobile device.

Zone H: of the mobile device enters this zone, after service may be pushed to the user. This may be customized by the user, and can be done, for instance, to send a notification to the user regarding the update of his balance, to offer discounts or simply to thank the user for traveling with a particular public transportation company.

In general, the user may set up a profile where different types of wishes can be set in the AFC system. In this way, the system can push any services to the user that may be of interest to him during his journey. Services can vary from food offers to practical transportation information.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another, Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 mobile device
102 secure element
104 UWB radio unit
200 mobile device
202 application processor
204 wireless communication unit
206 secure element and NFC unit
300 reader
302 UWB communication and tracking unit
304 processing unit
400 AFC system
402 terminal and gate
500 distance measurement
502 transmitter
504 receiver
506 receiver
508 transmitter
600 AFC system
602 terminal and reader
604 gate
606 user with mobile device
608 server
610 cloud

The invention claimed is:

1. A method for executing a transaction in an automated fare collection (AFC) system between a reader and a mobile device, the reader comprising a first ultra-wideband communication and tracking (UWBCT) unit and a processing unit operatively coupled to the first UWBCT unit, the mobile device comprising a secure element and an ultra-wideband (UWB) radio unit operatively coupled to the secure element, the method comprising:
 detecting, by the first UWBCT unit, that the mobile device enters an entry zone of the AFC system by communicating with the UWB radio unit, wherein the UWB radio unit transmits an identifier of the mobile device to the first UWBCT unit;
 in response to detecting that the mobile device enters a check-in zone of the AFC system by communicating with the UWB radio unit, initiating, by the first UWBCT unit, a first authentication process with the mobile device, wherein the mobile device stores a first credential in the secure element, the first credential associated with a starting point of a journey;
 in response to successful authentication of the first credential, placing a fare reservation for the mobile device with a ticket server of the AFC system; and
 in response to detecting that the mobile device is near an entry gate of the AFC system that is associated with the starting point of the journey, booking the fare reservation and opening the entry gate.

2. The method of claim 1, wherein the fare reservation comprises a predetermined fare for the journey, the starting point of the journey, and the identifier of the mobile device stored on the ticket server.

3. The method of claim 1, wherein the booking the fare reservation comprises:
 associating an active travel status with the fare reservation on the ticket server, and
 sending a registration message to the mobile device, the registration message comprising the active travel status.

4. The method of claim 1, further comprising:
 detecting, by a second UWBCT unit of the AFC system, that the mobile device enters an exit zone of the AFC system by communicating with the UWB radio unit, wherein the UWB radio unit transmits the identifier of the mobile device to the second UWBCT unit;

in response to detecting that the mobile device enters a check-out zone of the AFC system by communicating with the UWB radio unit, initiating, by the second UWBCT unit, a second authentication process with the mobile device, wherein the mobile device stores a second credential in the secure element, the second credential associated with a destination point of the journey;

in response to successful authentication of the second credential, obtaining the fare reservation booked for the mobile device and calculating a total fare for the journey; and in response to detecting that the mobile device is near an exit gate of the AFC system that is associated with the destination point of the journey, closing the fare reservation and opening the exit gate.

5. The method of claim 4, wherein the second credential is derived from or is equal to the first credential.

6. The method of claim 4, wherein the closing the fare reservation comprises:
changing the active travel status of the fare reservation stored on the ticket server to complete travel status,
charging an account of the mobile device for the total fare, and
sending a notification message to the mobile device, the notification message comprising confirmation of completion of the journey and a current balance of the account.

7. The method of claim 4, further comprising:
in response to unsuccessful authentication of the second credential, notifying a station guard of the AFC system of the unsuccessful authentication.

8. The method of claim 1, further comprising:
tracking, by the first UWBCT unit, the mobile device in the entry area and the check-in area, wherein the tracking comprises:
transmitting a challenge signal to the mobile device at a first time,
receiving a response signal from the mobile device at a second time, and
deriving a distance of the mobile device from the reader based on a time span between the first and second times.

9. The method of claim 8, further comprising:
deriving, by the first UWBCT unit, an angle of arrival based on a phase difference between the response signal received at a first receive antenna and at a second receive antenna of the reader.

10. The method of claim 9, wherein
the first and second receive antennas are separated by a distance equal to a multiple of a wavelength of the challenge signal, and
the multiple has a minimum value of one-half.

11. An automated fare collection (AFC) system comprising a first reader, a mobile device, and a ticket server, wherein the first reader comprises a first ultra-wideband communication and tracking (UWBCT) unit and a processing unit operatively coupled to the first UWBCT unit, and the mobile device comprises a secure element and an ultra-wideband (UWB) radio unit operatively coupled to the secure element, wherein
the first reader is configured to:
detect that the mobile device enters an entry zone of the AFC system by communication with the UWB radio unit, wherein the UWB radio unit is configured to transmit an identifier of the mobile device to the first UWBCT unit;
initiate a first authentication process with the mobile device in response to detection that the mobile device enters a check-in zone of the AFC system by communication with the UWB radio unit, wherein the mobile device is configured to store a first credential in the secure element, the first credential associated with a starting point of a journey;
place a fare reservation for the mobile device with the ticket server in response to successful authentication of the first credential; and
book the fare reservation and open an entry gate of the AFC system associated with the starting point of the journey in response to detection that the mobile device is near the entry gate.

12. The AFC system of claim 11, wherein the fare reservation comprises a predetermined fare for the journey, the starting point of the journey, and the identifier of the mobile device stored on the ticket server.

13. The AFC system of claim 11, wherein the first reader is further configured to:
associate an active travel status with the fare reservation on the ticket server, and
send a registration message to the mobile device, the registration message comprising the active travel status.

14. The AFC system of claim 11, wherein the AFC system further comprises:
a second reader comprising a second UWBCT unit configured to:
detect that the mobile device enters an exit zone of the AFC system by communicating with the UWB radio unit, wherein the UWB radio unit transmits the identifier of the mobile device to the second UWBCT unit;
initiate a second authentication process with the mobile device in response to detection that the mobile device enters a check-out zone of the AFC system by communication with the UWB radio unit, wherein the mobile device stores a second credential in the secure element, the second credential associated with a destination point of the journey;
obtain the fare reservation booked for the mobile device and calculate a total fare for the journey in response to successful authentication of the second credential; and
in response to detection that the mobile device is near the exit gate, close the fare reservation and open an exit gate of the AFC system that is associated with the destination point of the journey in response to detection that the mobile device is near the exit gate.

15. The AFC system of claim 14, wherein the second credential is derived from or is equal to the first credential.

16. The AFC system of claim 14, wherein the second reader is further configured to:
change the active travel status of the fare reservation stored on the ticket server to complete travel status,
charge an account of the mobile device for the total fare, and
send a notification message to the mobile device, the notification message comprising confirmation of completion of the journey and a current balance of the account.

17. The AFC system of claim 14, wherein the second reader is configured to:
notify a station guard of the AFC system of the unsuccessful authentication in response to unsuccessful authentication of the second credential.

18. The AFC system of claim 11, wherein the first reader is further configured to:
   track the mobile device in the entry area and the check-in area by being configured to:
      transmit a challenge signal to the mobile device at a first time,
      receive a response signal from the mobile device at a second time, and
      derive a distance of the mobile device from the reader based on a time span between the first and second times.

19. The AFC system of claim 18, the first reader is further configured to:
   derive an angle of arrival based on a phase difference between the response signal received at a first receive antenna and at a second receive antenna of the reader.

20. The AFC system of claim 19, wherein
   the first and second receive antennas are separated by a distance equal to a multiple of a wavelength of the challenge signal, and
   the multiple has a minimum value of one-half.

* * * * *